(12) United States Patent
Saini et al.

(10) Patent No.: US 12,537,596 B2
(45) Date of Patent: Jan. 27, 2026

(54) BACKSCATTER ENERGY HARVESTING USING A RECONFIGURABLE INTELLIGENT SURFACE (RIS)

(71) Applicant: Cisco Technology, Inc., San Jose, CA (US)

(72) Inventors: Vinay Saini, Bangalore (IN); Ram R. Mohan, Bangalore (IN)

(73) Assignee: Cisco Technology, Inc.

( * ) Notice: Subject to any disclaimer, the term of this patent is extended or adjusted under 35 U.S.C. 154(b) by 71 days.

(21) Appl. No.: 18/422,902

(22) Filed: Jan. 25, 2024

(65) Prior Publication Data

US 2025/0247146 A1    Jul. 31, 2025

(51) Int. Cl.
| | | |
|---|---|---|
| *H04B 7/22* | (2006.01) | |
| *G06K 7/10* | (2006.01) | |
| *H04B 5/72* | (2024.01) | |

(52) U.S. Cl.
CPC .......... *H04B 7/22* (2013.01); *G06K 7/10227* (2013.01); *G06K 7/10366* (2013.01); *H04B 5/72* (2024.01)

(58) Field of Classification Search
CPC ........ H04B 7/22; H04B 5/72; G06K 7/10227; G06K 7/10366
See application file for complete search history.

(56) References Cited

U.S. PATENT DOCUMENTS

| | | | | |
|---|---|---|---|---|
| 11,689,345 B2* | 6/2023 | Polehn | ................... | H04L 5/1438 |
| | | | | 370/280 |
| 11,770,175 B2* | 9/2023 | Dai | ...................... | H04W 8/005 |
| | | | | 370/315 |
| 12,155,426 B2* | 11/2024 | Barton | ..................... | H04B 7/22 |
| 12,309,614 B1* | 5/2025 | Chen | ...................... | H04W 16/14 |
| 2022/0278738 A1* | 9/2022 | Dai | ..................... | H04B 7/15507 |

(Continued)

FOREIGN PATENT DOCUMENTS

| | | | | | |
|---|---|---|---|---|---|
| CN | 112019271 A | * | 12/2020 | ........... | H04L 1/0054 |
| CN | 112019271 B | * | 8/2021 | ........... | H04B 10/541 |

(Continued)

OTHER PUBLICATIONS

R. Fara et al. "Reconfigurable Intelligent Surface-Assisted Ambient Backscatter Communications—Experimental Assessment" IEEE Xplore Jul. 9, 2021, 10.1109/ICCWorkshops50388.2021.9473842 (7 pages).

(Continued)

*Primary Examiner* — Berhanu Tadese
(74) *Attorney, Agent, or Firm* — Merchant & Gould P.C.

(57) ABSTRACT

Optimized backscatter energy harvesting using a Reconfigurable Intelligent Surface (RIS) may be provided. Energy parameters may be received from a backscatter communication device. Then an energy critical message may be received from the backscatter communication device. The backscatter communication device may then be instructed to send frequent messages in response to receiving the energy critical message from the backscatter communication device. Next, a configuration for a Reconfigurable Intelligent Surface (RIS) cluster may be determined to supply energy to the backscatter communication device based on the energy parameters and the frequent messages. The RIS may be caused to supply energy to the backscatter communication device based on the configuration.

20 Claims, 5 Drawing Sheets

(56) References Cited

U.S. PATENT DOCUMENTS

| | | | | |
|---|---|---|---|---|
| 2023/0087862 | A1* | 3/2023 | Dai | H04B 7/0619 |
| | | | | 370/315 |
| 2023/0308139 | A1 | 9/2023 | Baligh et al. | |
| 2023/0412003 | A1* | 12/2023 | Farhadi | H02J 50/80 |
| 2024/0015661 | A1* | 1/2024 | Wang | H04B 7/15528 |
| 2024/0088957 | A1* | 3/2024 | Wang | G06K 19/0723 |
| 2024/0235271 | A1* | 7/2024 | Tayyab | H02J 50/001 |
| 2024/0323931 | A1* | 9/2024 | Abedini | H04B 7/04013 |
| 2024/0333338 | A1* | 10/2024 | Gandhi | H04B 7/0426 |
| 2024/0333339 | A1* | 10/2024 | Barton | H04B 7/04013 |
| 2024/0340706 | A1* | 10/2024 | Huang | H04B 7/15528 |
| 2024/0356625 | A1* | 10/2024 | Walker | H04B 7/15528 |
| 2024/0405808 | A1* | 12/2024 | Barton | H04B 7/22 |
| 2025/0062841 | A1* | 2/2025 | Patchava | H04B 7/0617 |
| 2025/0088266 | A1* | 3/2025 | Tayyab | H04B 7/04013 |
| 2025/0096849 | A1* | 3/2025 | Bhattacherjee | H04W 56/001 |

FOREIGN PATENT DOCUMENTS

| | | | | |
|---|---|---|---|---|
| CN | 114157333 | A * | 3/2022 | H04B 7/04013 |
| CN | 114554520 | A * | 5/2022 | H04W 24/02 |
| CN | 115967925 | A * | 4/2023 | |
| CN | 116366200 | A * | 6/2023 | H04L 1/0045 |
| CN | 116366400 | A * | 6/2023 | H04L 25/03305 |
| CN | 116634544 | A * | 8/2023 | H04W 52/242 |
| CN | 116636156 | A * | 8/2023 | H04B 7/04013 |
| CN | 118019012 | A * | 5/2024 | H04L 41/142 |
| CN | 118044123 | A * | 5/2024 | H04B 7/06952 |
| CN | 118591008 | A * | 9/2024 | H02J 50/80 |
| CN | 114554520 | B * | 10/2024 | H04L 5/0051 |
| CN | 118741561 | A * | 10/2024 | H04B 7/086 |
| CN | 119210527 | A * | 12/2024 | H04B 7/086 |
| CN | 119631312 | A * | 3/2025 | G06K 7/10178 |
| EP | 4142174 | A1 * | 3/2023 | H04B 7/026 |
| EP | 4369630 | A1 * | 5/2024 | H04B 7/04026 |
| EP | 4443934 | A1 * | 10/2024 | H04B 7/15528 |
| JP | 2024534843 | A * | 9/2024 | H04W 60/00 |
| KR | 20240054294 | A * | 4/2024 | H04B 7/06952 |
| KR | 20240128957 | A * | 8/2024 | H04L 25/03305 |
| KR | 20250002943 | A * | 1/2025 | G06K 19/0723 |
| WO | WO-2021207748 | A2 * | 10/2021 | |
| WO | 2022133952 | A1 | 6/2022 | |
| WO | 2022133958 | A1 | 6/2022 | |
| WO | 2022151128 | A1 | 7/2022 | |
| WO | 2022188052 | A1 | 9/2022 | |
| WO | WO-2022182417 | A1 * | 9/2022 | H04W 8/005 |
| WO | WO-2023010309 | A1 * | 2/2023 | H04L 5/005 |
| WO | WO-2023025888 | A2 * | 3/2023 | H04W 60/00 |
| WO | WO-2023044225 | A1 * | 3/2023 | H04B 7/06952 |
| WO | WO-2023125402 | A1 * | 7/2023 | H04L 1/0045 |
| WO | 2023149828 | A1 | 8/2023 | |
| WO | WO-2024010696 | A1 * | 1/2024 | H04B 7/15528 |
| WO | WO-2024015324 | A1 * | 1/2024 | H04B 7/04013 |
| WO | WO-2024059419 | A1 * | 3/2024 | H04B 7/0617 |
| WO | WO-2025005372 | A1 * | 1/2025 | G06K 19/0723 |
| WO | WO-2025067117 | A1 * | 4/2025 | H04W 4/80 |
| WO | WO-2025080958 | A1 * | 4/2025 | H04W 16/18 |

OTHER PUBLICATIONS

International Search Report and Written Opinion for International Application No. PCT/US2025/013016, mailed May 9, 2025, 18 Pages.

Tavana M., et al., "Amplitude-Based Sequential Optimization of Energy Harvesting with Reconfigurable Intelligent Surfaces", arXiv:2307.11523v1, Jul. 21, 2023, 6 Pages, XP093232698, DOI: 10.48550/arXiv.2307.11523, Retrieved from https://arxiv.org/pdf/2307.11523, Figures 2b, 3.

* cited by examiner

BACKSCATTER ENERGY HARVESTING USING A RECONFIGURABLE INTELLIGENT SURFACE (RIS)

TECHNICAL FIELD

The present disclosure relates generally to backscatter energy harvesting using a Reconfigurable Intelligent Surface (RIS).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Optimized backscatter energy harvesting using a Reconfigurable Intelligent Surface (RIS) may be provided. Energy parameters may be received from a backscatter communication device. Then an energy critical message may be received from the backscatter communication device. The backscatter communication device may then be instructed to send frequent messages in response to receiving the energy critical message from the backscatter communication device. Next, a configuration for a Reconfigurable Intelligent Surface (RIS) cluster may be determined to supply energy to the backscatter communication device based on the energy parameters and the frequent messages. The RIS cluster may be caused to supply energy to the backscatter communication device based on the configuration.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Backscatter Communication (i.e., BackCom) may use, light, ambient, or dedicated Radio Frequency (RF) energy to allow battery-less/very low-powered devices to communicate (e.g., at slow speed). For example, backscatter communication may be used for passive Radio Frequency Identification (RFID) tags. Internet-of-Things (IoT) sensors may be more and more ubiquitous, and they may be required to have battery power. This battery power requirement may increase maintenance costs. With backscatter communication, a sensor may be battery-less or use a very small battery that may last years and harvesting RF energy.

Ambient RF energy may be harvested to power battery-less or battery-powered devices. Battery life is a common issue for IoT devices supporting Wi-Fi. These devices send little, but critical traffic. Such traffic is sometimes unpredictable as these devices may be programmed to send continuous messages when there is a specific trigger such as the detection of harmful gas in a refinery for example. Backscatter technology may be looked at as potential communication technology, but it may need usable energy from a source. APs may transmit using omni antennas and may not be in the best location to help the client devices in need of critical communication as they may have fixed antennas. Reconfigurable Intelligent Surfaces (RIS) may be used in such cases as they may be programmed to change their signal propagation. Embodiments of the disclosure may provide intelligence in the form of dynamic feedback on how and when to use the RIS and what may be the best configuration. Having such an ability to provide dynamic feedback to the RIS for energy harvesting may allow the RIS to service devices in an energy crisis with priority for example.

Figure 1:
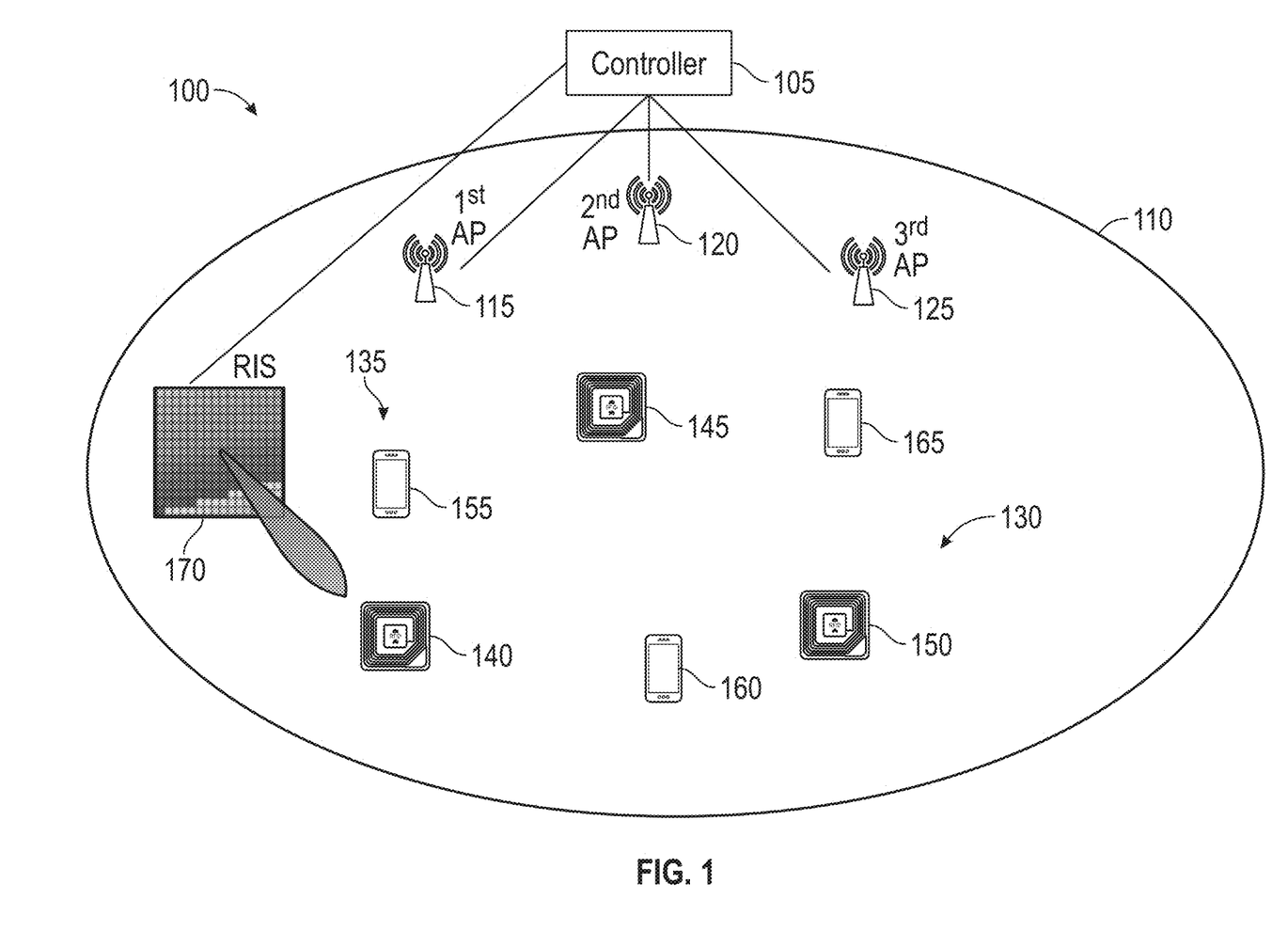
FIG. 1 is a block diagram of an operating environment for providing backscatter energy harvesting using a Reconfigurable Intelligent Surface (RIS)

FIG. 1 shows an operating environment 100 for providing backscatter energy harvesting using an RIS. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN) for devices. The plurality of APs may comprise a first AP 115, a second AP 120, and a third AP 125. Each of the plurality of APs may be compatible with specification standards such as, but not limited to, the Institute of Electrical and Electronics Engineers (IEEE) 802.11 specification standard for example.

A first plurality of devices 130 and a second plurality of devices 135 may be deployed in coverage environment 110. The plurality of APs may provide wireless network access to first plurality of devices 130 and second plurality of devices 135 as the devices move within coverage environment 110. Coverage environment 110 may comprise an outdoor or indoor wireless environment for Wi-Fi or any type of wireless protocol or standard.

First plurality of devices 130 may comprise a first device 140, a second device 145, and a third device 150. First plurality of devices 130 may comprise backscatter communication devices, for example, RFID tags. First plurality of devices 130 may comprise, but are not limited to, general energy harvesting devices and pure backscatter communication devices. General energy harvesting devices may comprise devices that work in two phases: i) first harvesting RF energy for a time period; then ii) transmitting using this harvested RF energy. General energy harvesting devices may comprise battery-less Bluetooth Low Energy (BLE) chips for example. With a pure backscatter communication device, the RF signal that provides power may also be the one that is backscattered/modified according to some modulation hence encoding some symbols of information. In addition, first plurality of devices 130 may comprise devices that may receive or harvest energy from light energy and then use the energy from light to power transmission. First plurality of devices 130 may also comprise devices that may harvesting RF energy (e.g., RF energy) to recharge a battery or other energy storage element within the device.

Second plurality of devices 135 may comprise a first client device 155, a second client device 160, and a third client device 165. Ones of second plurality of devices 135 may comprise, but are not limited to, a smart phone, a personal computer, a tablet device, a mobile device, a telephone, a remote control device, a set-top box, a digital video recorder, an Internet-of-Things (IoT) device, a network computer, a router, an AR/VR device an Automated Transfer Vehicle (ATV), a drone, an Unmanned Aerial Vehicle (UAV), a smart wireless light bulb, or other similar microcomputer-based device.

Controller 105 may comprise a Wireless Local Area Network controller (WLC) and may provision and control coverage environment 110 (e.g., a WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide backscatter energy harvesting using an RIS.

Operating environment 100 may also comprise a Reconfigurable Intelligent Surface (RIS) cluster 170 that may be controlled by controller 105. RIS 170 cluster may comprise an electronically controlled metasurface composed of a large array of passive reflecting elements that may reflect RF waves in a controlled manner to allow operators improve the efficiency and the coverage of their network. In other words, RIS cluster 170 may comprise an array of backscatters, where each element may control electronically and individually the phase-shift (and/or an amplitude and/or a polarization rotation) with which it backscatters an incident wave. By applying a particular set of phase-shifts, RIS cluster 170 may control the direction of the reflection (e.g., it may create a reflected beam).

The elements described above of operating environment 100 (e.g., controller 105, first AP 115, second AP 120, third AP 125, first device 140, second device 145, third device 150, first client device 155, second client device 160, and third client device 165) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
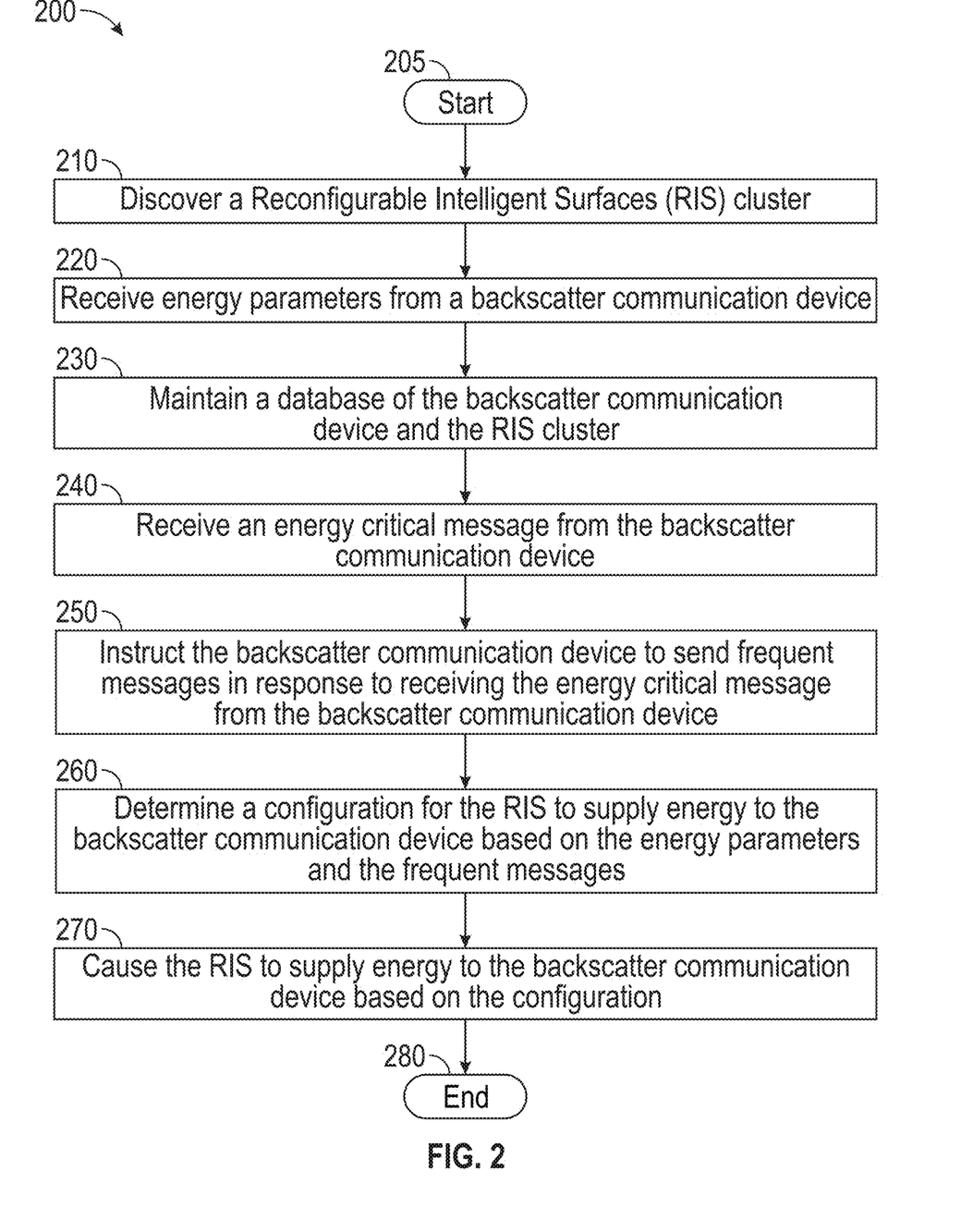
FIG. 2 is a flow chart of a method for providing backscatter energy harvesting using an RIS.
Figure 3A:
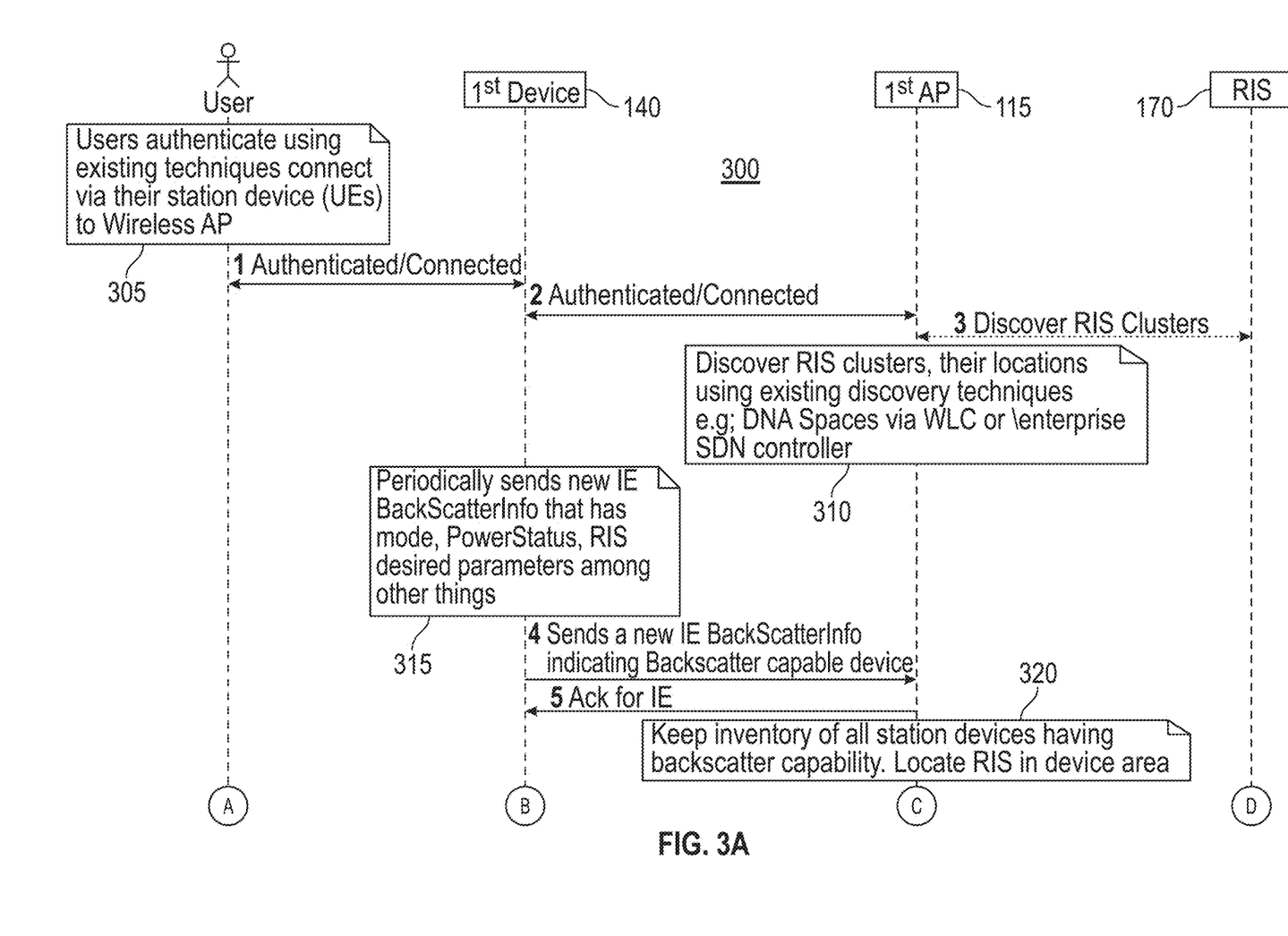
FIG. 3A and FIG. 3B are flow diagrams of a method for providing backscatter energy harvesting using an RIS.
Figure 3B:
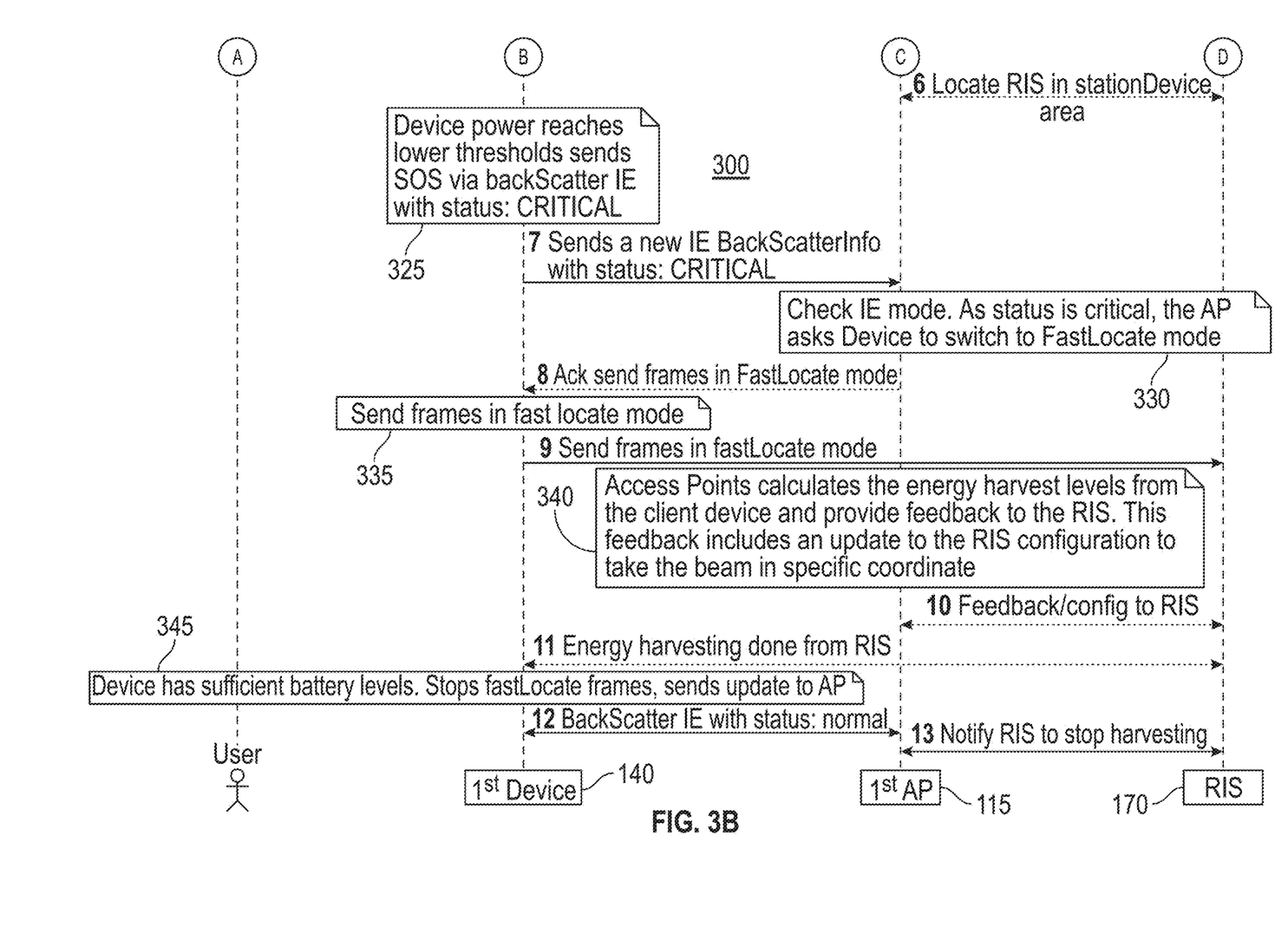

FIG. 2 is a flow chart setting forth the general stages involved in a method 200 consistent with embodiments of the disclosure for providing backscatter energy harvesting using an RIS. FIG. 3A and FIG. 3B are flow diagrams setting forth the general stages involved in a method 300 consistent with embodiments of the disclosure for providing backscatter energy harvesting using an RIS. Method 200 and method 300 may be implemented using a computing device 400 as described in more detail below with respect to FIG. 4. Computing device 400 may be embodied by controller 105 or any of the plurality of APs for example. Ways to implement the stages of method 200 and method 300 will be described in greater detail below.

RIS cluster 170 may allow changing of its configuration to have more controlled and goal-oriented energy beams. Embodiments of the disclosure may provide a process that may pass feedback to RIS cluster 170 for Wi-Fi/Backscatter energy harvesting.

Method 200 may begin at starting block 205 and proceed to stage 210 where computing device 400 may discover RIS cluster 170. For example, users may implement an authentication process (see stage 305 of FIG. 3A). First AP 115 may have details of RIS cluster 170's availability in a given area. This may be a tracked based fixed location-based processes. For example, first AP 115 may use controller 105 (e.g., a DNAC controller) to learn RIS cluster 170's locations between first AP 115 and first plurality of devices 130 (see stage 310 of FIG. 3A).

From stage 210, where computing device 400 discovers RIS cluster 170, method 200 may advance to stage 220 where computing device 400 may receive energy parameters from a backscatter communication device (e.g., first device 140). For example, devices supporting the backscatter communication processes may be tracked by AP 115 (see stage 315 of FIG. 3A). This may be done via an Information Element (IE) (e.g., a Backscatter Energy Parameter IE). The mode of the IE and content may be based on the energy levels of the backscatter communication device. The Backscatter Energy Parameter IE may contain parametric information including, for example: i) power status (e.g., a binary status, 00 meaning good, 01 meaning low power, a battery percentage status (e.g., 20%), or a projected remaining battery life time value (e.g., 40 min)); ii) device mode (e.g., normal, critical, etc.); and iii) RIS properties expected/desired (e.g., electromagnetic properties, radio frequency signal, etc.).

Once computing device 400 receives the energy parameters from the backscatter communication device (e.g., first device 140) in stage 220, method 200 may continue to stage 230 where computing device 400 may maintain a database of the backscatter communication device and RIS cluster 170 (see stage 320 of FIG. 3A). For example, first AP 115 or controller 105 may maintain a database of the location of RIS cluster 170, a location of the backscatter communication devices, and the current energy parameters from the backscatter communication devices.

After computing device 400 maintains the database of the backscatter communication device (e.g., first device 140) and RIS cluster 170 in stage 230, method 200 may proceed to stage 240 where computing device 400 may receive an energy critical message from the backscatter communication device (see stage 325 of FIG. 3B). For example, backscatter communication devices (e.g., first device 140) in low or critical power may update first AP 115 of its desire to switch to backscatter communication for a certain duration. This may be done while the device still has battery power and is able to send Wi-Fi frames.

First AP 115 may identify RIS cluster 170 availability in the area and may start to collect feedback from first device 140 about the level of signal available to it. This may be done in a passive mode by first AP 115 by listening to the backscatter communication from first device 140. One or more the plurality of APs in the vicinity may listen to such communication.

From stage 240, where computing device 400 receives the energy critical message from the backscatter communication device (e.g., first device 140), method 200 may advance to stage 250 where computing device 400 may instruct the backscatter communication device to send frequent messages in response to receiving the energy critical message from the backscatter communication device. For example, in order to assist RIS cluster 170, the backscatter communication device (e.g., first device 140) may be asked to send frames frequently in a mode (e.g., Fast Locate mode). The backscatter device may respond with a small message with its Identifier (ID) to help the system track its location (see stages 330 and 335 of FIG. 3B).

Once computing device 400 instructs the backscatter communication device (e.g., first device 140) to send frequent messages in response to receiving the energy critical message from the backscatter communication device in stage 250, method 200 may continue to stage 260 where computing device 400 may determine a configuration for RIS cluster 170 to supply energy to the backscatter communication device based on the energy parameters and the frequent messages. For example, based on the received frames from the backscatter communication device (e.g., first device 140), first AP 115 may calculate the energy harvest levels from the backscatter communication device and provide feedback to RIS cluster 170. This feedback may include an update to the RIS configuration to take a beam from RIS cluster 170 in specific coordinates for example (see stage 340 of FIG. 3B). Such a configuration of RIS cluster 170 may be saved per location for any future requirements as a base configuration so that the system does not have to start from zero again. It may be tied to backscatter device type and density for a location.

After computing device 400 determines the configuration for RIS cluster 170 to supply energy to the backscatter communication device based on the energy parameters and the frequent messages in stage 260, method 200 may proceed to stage 270 where computing device 400 may cause RIS cluster 170 to supply energy to the backscatter communication device (e.g., first device 140) based on the configuration. For example, once a best configuration is applied to RIS cluster 170, first AP 115 (e.g., or APs in the nearby vicinity of first device 140) may transmit to RIS cluster 170 that may then send energy to the backscatter communication device in need (e.g., first device 140). Once computing device 400 cause RIS cluster 170 to supply energy to the backscatter communication device based on the configuration in stage 270, method 200 may then end at stage 280.

Figure 4:
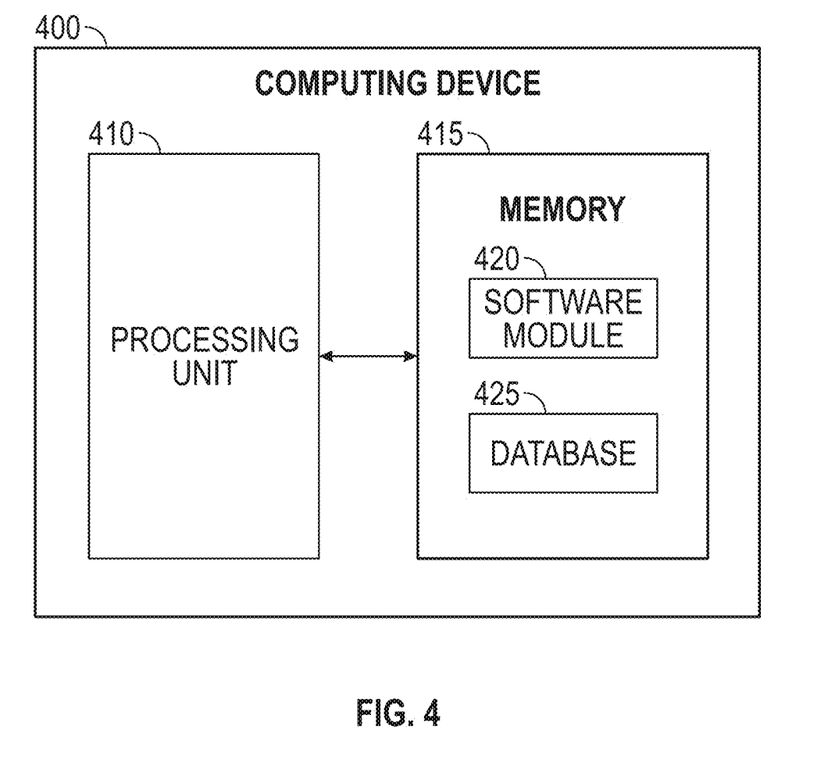
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing backscatter energy harvesting using an RIS as described above with respect to FIG. 2 and FIG. 3A and FIG. 3B. Computing device 400, for example, may provide an operating environment for controller 105, first AP 115, second AP 120, third AP 125, first device 140, second device 145, third device 150, first client device 155, second client device 160, and third client device 165. Controller 105, first AP 115, second AP 120, third AP 125, first device 140, second device 145, third device 150, first client device 155, second client device 160, and third client device 165 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving energy parameters from a backscatter communication device;
   receiving an energy critical message from the backscatter communication device;
   instructing the backscatter communication device to send frequent messages in response to receiving the energy critical message from the backscatter communication device;
   determining a configuration for a Reconfigurable Intelligent Surface (RIS) cluster to supply energy to the backscatter communication device based on the energy parameters and the frequent messages;
   causing the RIS cluster to supply energy to the backscatter communication device based on the configuration; and
   saving the configuration for a future use in causing the RIS cluster to supply energy to the backscatter communication device based on the configuration.

2. The method of claim 1, further comprising discovering the RIS cluster.

3. The method of claim 1, further comprising maintaining a database of the backscatter communication device and the RIS cluster.

4. The method of claim 1, further comprising sending the configuration to the RIS cluster.

5. The method of claim 1, wherein the energy parameters comprise at least one of a power status, a device mode, and RIS properties expected.

6. The method of claim 1, wherein the frequent messages comprise an Identifier (ID) associated with the backscatter communication device.

7. The method of claim 1, further comprising:
   determining energy harvest levels from the backscatter communication device; and
   providing feedback to RIS cluster.

8. A system comprising:
   a memory storage; and
   a processing unit coupled to the memory storage, wherein the processing unit is operative to:
      receive energy parameters from a backscatter communication device;
      receive an energy critical message from the backscatter communication device;
      instruct the backscatter communication device to send frequent messages in response to receiving the energy critical message from the backscatter communication device;
      determine a configuration for a Reconfigurable Intelligent Surface (RIS) cluster to supply energy to the backscatter communication device based on the energy parameters and the frequent messages;
      cause the RIS cluster to supply energy to the backscatter communication device based on the configuration; and
      save the configuration for a future use in causing the RIS cluster to supply energy to the backscatter communication device based on the configuration.

9. The system of claim 8, wherein the processing unit is further operative to discover the RIS cluster.

10. The system of claim 8, wherein the processing unit is further operative to maintain a database of the backscatter communication device and the RIS cluster.

11. The system of claim 8, wherein the processing unit is further operative to send the configuration to the RIS cluster.

12. The system of claim 8, wherein the energy parameters comprise at least one of a power status, a device mode, and RIS properties expected.

13. The system of claim 8, wherein the frequent messages comprise an Identifier (ID) associated with the backscatter communication device.

14. A non-transitory computer-readable medium that stores a set of instructions which when executed perform a method executed by the set of instructions comprising:
   receiving energy parameters from a backscatter communication device;
   receiving an energy critical message from the backscatter communication device;
   instructing the backscatter communication device to send frequent messages in response to receiving the energy critical message from the backscatter communication device;
   determining a configuration for a Reconfigurable Intelligent Surface (RIS) cluster to supply energy to the backscatter communication device based on the energy parameters and the frequent messages;
   causing the RIS cluster to supply energy to the backscatter communication device based on the configuration; and
   saving the configuration for a future use in causing the RIS cluster to supply energy to the backscatter communication device based on the configuration.

15. The non-transitory computer-readable medium of claim 14, further comprising discovering the RIS cluster.

16. The non-transitory computer-readable medium of claim 14, further comprising maintaining a database of the backscatter communication device and the RIS cluster.

17. The non-transitory computer-readable medium of claim 14, further comprising sending the configuration to the RIS cluster.

18. The non-transitory computer-readable medium of claim 14, wherein the energy parameters comprise at least one of a power status, a device mode, and RIS properties expected.

19. The non-transitory computer-readable medium of claim 14, wherein the frequent messages comprise an Identifier (ID) associated with the backscatter communication device.

20. The non-transitory computer-readable medium of claim 14, further comprising:
   determining energy harvest levels from the backscatter communication device; and
   providing feedback to RIS cluster.

* * * * *